(12) United States Patent
Wang

(10) Patent No.: US 12,372,212 B2
(45) Date of Patent: Jul. 29, 2025

(54) SURFACE ASSEMBLY, INTERIOR PART AND INTERIOR SYSTEM

(71) Applicant: FAURECIA (CHINA) HOLDING CO., LTD., Shanghai (CN)

(72) Inventor: Huidong Wang, Shanghai (CN)

(73) Assignee: FAURECIA (CHINA) HOLDING CO., LTD., Shanghai (CN)

( * ) Notice: Subject to any disclaimer, the term of this patent is extended or adjusted under 35 U.S.C. 154(b) by 0 days.

(21) Appl. No.: 18/922,296

(22) Filed: Oct. 21, 2024

(65) Prior Publication Data
US 2025/0129904 A1   Apr. 24, 2025

(30) Foreign Application Priority Data

Oct. 19, 2023   (CN) .......................... 202322816291.9

(51) Int. Cl.
| | |
|---|---|
| *F21S 8/00* | (2006.01) |
| *F21V 23/00* | (2015.01) |
| *B60Q 3/50* | (2017.01) |
| *B60Q 3/62* | (2017.01) |
| *F21W 106/00* | (2018.01) |
| *F21Y 103/30* | (2016.01) |
| *F21Y 115/10* | (2016.01) |
| *F21Y 115/30* | (2016.01) |

(52) U.S. Cl.
CPC .............. *F21S 8/00* (2013.01); *F21V 23/003* (2013.01); *B60Q 3/50* (2017.02); *B60Q 3/62* (2017.02); *F21V 2200/15* (2015.01); *F21W 2106/00* (2018.01); *F21Y 2103/30* (2016.08); *F21Y 2115/10* (2016.08); *F21Y 2115/30* (2016.08)

(58) Field of Classification Search
CPC ...... F21S 8/00; F21V 23/003; F21V 2200/15; F21Y 2103/30; F21Y 2115/30; F21Y 2115/10; B60Q 3/62; B60Q 3/50; B60Q 3/64; B60Q 3/66; B60Q 3/20; B60Q 3/30; B60Q 3/00; F21W 2106/00
See application file for complete search history.

(56) References Cited

U.S. PATENT DOCUMENTS

| | | | |
|---|---|---|---|
| 2012/0313391 A1* | 12/2012 | Kornylo | ............... B60N 2/5883 112/440 |
| 2013/0077338 A1* | 3/2013 | Wenzel | ................. G02B 6/001 362/551 |
| 2019/0100074 A1* | 4/2019 | Yamane | ................. B60R 13/02 |

* cited by examiner

*Primary Examiner* — Bao Q Truong
(74) *Attorney, Agent, or Firm* — Kilpatrick Townsend & Stockton LLP

(57) ABSTRACT

The present disclosure provides a surface assembly, an interior part and an interior system. And the surface assembly includes a skin, and an outer surface of the skin being used as the outer surface of the surface assembly, and as a visible surface to the user provided by the surface assembly, and the skin further includes an inner surface opposite to the outer surface; and a light guiding stitch, the light guiding stitch being connected with the skin by a sewing configuration, and the sewing configuration includes a first part located on the outer surface, a second part penetrating thickness of the skin; and a third part located in the inner surface; and the light guiding stitch provides a light path that a light beam enters the light guiding stitch at one end in length direction of the light guiding stitch, and emits through at least one first part.

10 Claims, 5 Drawing Sheets

SURFACE ASSEMBLY, INTERIOR PART AND INTERIOR SYSTEM

FIELD

The present disclosure relates to a surface assembly, an interior part and an interior system.

BACKGROUND

For skin of an object, such as skin of a vehicle interior part, users have a need that surface of the skin emits light, for example as an ambient lighting apparatus.

However, in current solutions, structure that realizes the function of surface luminescence is generally to set a light source, a light guide plate and corresponding mounting and fixing structure in the space below inner surface of interior panel, and the structure of surface luminescence is complex, occupying a large space, and easy to leak light. And normally it needs to set a specific grooved in the interior panel to realize the setting of the structure of surface luminous function, and the surface of the interior panel is visually discontinuous, affecting its outer looking to the users.

Therefore, a surface assembly, an interior part, and an interior system are needed, to realize the function of surface luminescence through a simple structure, improve the user experience of interior parts and interior systems, reduce space being occupied, reduce material costs, and reduce processing and manufacturing costs.

SUMMARY

The present disclosure provides a surface assembly.
The present disclosure provides an interior part.
The present disclosure provides an interior system.

The present disclosure provides a surface assembly according to embodiments of the disclosure. The surface assembly includes a skin, and an outer surface of the skin being used as the outer surface of the surface assembly, and as a visible surface to the user provided by the surface assembly, and the skin further includes an inner surface opposite to the outer surface; and a light guiding stitch, the light guiding stitch being connected with the skin by a sewing configuration, and the sewing configuration includes a first part located on the outer surface, a second part penetrating thickness of the skin; and a third part located in the inner surface; and the light guiding stitch provides a light path that a light beam enters the light guiding stitch at one end in length direction of the light guiding stitch, and emits through at least one first part.

Further, in some embodiments of the present disclosure, the light guiding stitch is made of PMMA.

Further, in some embodiments of the present disclosure, the light guiding stitch is made of PC, TPE, or TPU.

Further, in some embodiments of the present disclosure, the skin is made of leather, artificial leather, or fabric.

Further, in some embodiments of the present disclosure, the surface assembly further includes a light source, a light beam from the light source follows a light path that the light enters the light guiding stitch at one or more ends in length direction of the third part of the light guiding stitch.

Further, in some embodiments of the present disclosure, the light source includes Mini-LED or Laser Diode.

Further, in some embodiments of the present disclosure, the skin includes a first skin and a second skin; and the first skin and the second skin are connected through a double felled seam, and the light guiding stitches are respectively located on a first felled region, and a second felled region of the double felled seam; or the first skin and the second skin are connected through a fake double felled seam, and the first skin includes a first base part and a first connecting part, the second skin includes a second base part and a second connecting part, and a connector is set between the first connecting part and the second connecting part, and the first connecting part, the second connecting part and the connector are sewed and connected; and the light guiding stitches are respectively located on the first base part and second base part; or the first skin and the second skin are connected through a single felled seam, and one of the first skin or the second skin provides a felled part, and the other provides a connecting part directly connected to the felled part, and the light guiding stitch is located on the felled part and the connecting part; or the first skin and the second skin are connected through a fake single felled seam, and one of the first skin or the second skin provides a felled part, and the other provides a connecting part, and a connector is provided between the felled part and the connecting part, and felled part, the connecting part and the connector are sewed and connected, and the light guiding stitch is located on the felled part, the connecting part, and the connector.

In addition, the present disclosure provides an interior part, and the interior part includes the surface assembly of the above embodiments, and the outer surface of the skin is used as at least part of the visible surface of the interior part.

Further, in some embodiments of the present disclosure, the interior part further includes a control unit, and the control unit is electronically connected to a light source.

In addition, the present disclosure provides an interior system and the interior system includes the interior part of the above embodiments.

DESCRIPTION OF ATTACHED DRAWINGS

The above embodiments of the present disclosure will be better understood after reading the detailed description of the embodiments of the present disclosure in conjunction with the following figures. In the figures, components are not necessarily drawn to scale, and components having similar related features may have the same or similar reference numerals.

Figure 1:
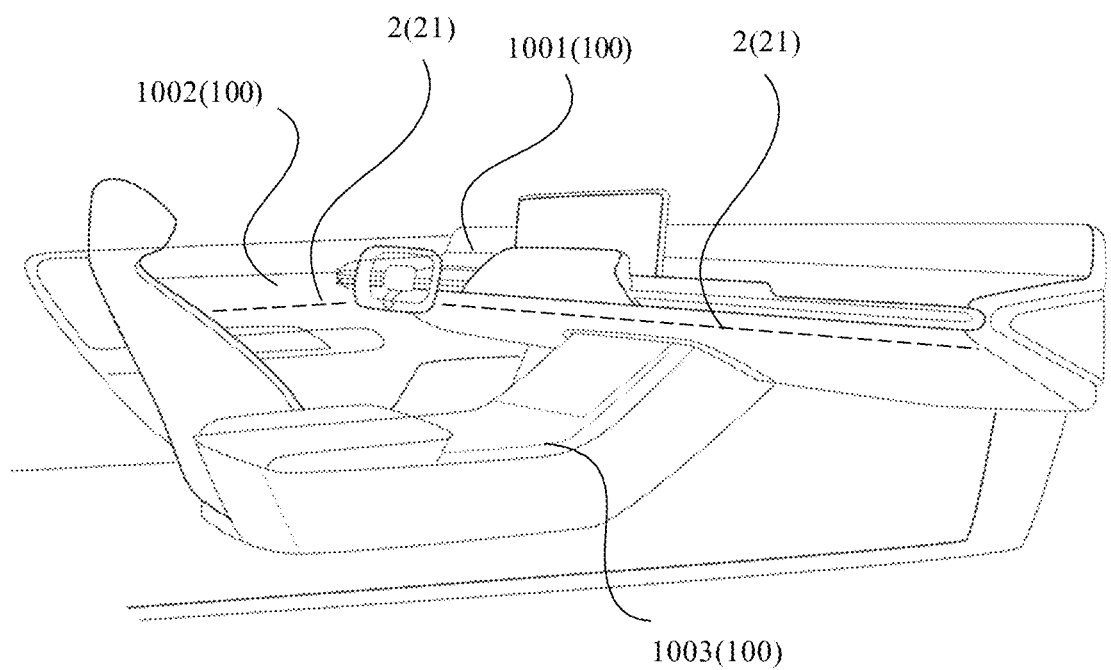
FIG. 1 is a structural diagram of an interior system in accordance with some embodiments of the present disclosure.

FIG. 4A, FIG. 4B, FIG. 4C, and FIG. 4D are structural diagrams in accordance with a first embodiment, a second embodiment, a third embodiment and a fourth embodiment of the present disclosure.

REFERENCE NUMERALS

1000—interior system
100—interior part
1001—dashboard
1002—door panel
1003—center console
10—surface assembly 101—first skin
1011—first base part
1012—first connecting part
102—second skin
1021—second base part
1022—second connecting part
11—outer surface
12—inner surface
2—light guiding stitch
20—sewing configuration
21—first part
22—second part
23—third part
200—light beam
3—light source
41—double felled seam
411—first felled region
412—second felled region
42—fake double felled seam
421,433—connector
43—single felled seam
431,441—felled part
432,442—connecting part
44—fake single felled seam
5—control unit.

DETAILED DESCRIPTION OF EMBODIMENTS

The implementations of the present disclosure are described below by the embodiments. Embodiment of the present disclosure from the contents disclosed in the description. Although the description of the present disclosure is introduced together with other embodiments, it does not mean that the features of the present disclosure are limited to the embodiments. On the contrary, the purpose of introducing the present disclosure in combination with the embodiments is to cover other embodiments that may be extended based on the claims of the present disclosure.

It should be noted that in the following description, for example, "one embodiment", "an embodiment", and/or "some embodiments" refer to a feature, structure or characteristic related to at least one embodiment of the present disclosure. Therefore, it should be emphasized and noted that "an embodiment" or "one embodiment" or "one or more embodiments" mentioned twice or more in different positions in this specification do not necessarily refer to the same embodiment. In addition, some features, structures or characteristics in one or more embodiments of the present disclosure may be appropriately combined.

It should be explained that the transparent described in the following embodiments does not refer to strict physically transparent, but rather to the ability to transmit light. For observers, they can see a structure covered by a transparent layer through the layer. For example, physically transparent and translucent are both within the definition of "transparent" in the following embodiments.

Although the surface assembly, the interior part and interior system disclosed in the embodiments of the present disclosure can be applied to automobiles, they are not limited thereto. For example, they can also be applied to other vehicles, such as railway train, ship, and airplane, as long as they are vehicles, the surface assembly, the interior part and interior system disclosed in the embodiments of the present disclosure can be applied. The surface assembly of the present disclosure is particularly suitable for the interior parts of the vehicle due to its surface luminescence and the overall surface appearance, but not limited thereto, for example, it can also be used as surface of a seat, for example, it can also be used for other scenes, such as be used as surface of an intelligent leather goods, but not limited thereto.

Referring to FIG. 1, an interior system 1000, taking an automobile interior system as an example, includes an interior part 100, which includes, for example, a dashboard 1001, a door panel 1002, a center console 1003, etc. Currently, the dashboard 1001 and the door panel 1002 are generally of a split structure, and the dashboard 1001 and the door panel 1002 can be visually distinguished from each other. However, it is not excluded that the structures of the dashboard 1001 and the door panel 1002 are similar, forming an interior system 1000 in which the dashboard 1001 and the door panel 1002 form an integrated visual perception.

For an interior part 100 described in the following embodiments, taking the dashboard 1001 as an example, because the position corresponding to the dashboard 1001 is a part located in the front position, and its good visual effect can be felt more by users of the automobile, but not limited thereto.

Referring to FIG. 2A, FIG. 2B, FIG. 3A, and FIG. 3B, in some embodiments, the surface assembly 10 includes a skin 1 and a light guiding stitch 2.

An outer surface 11 of the skin 1 is used as the outer surface of the surface assembly 10, and as a visible surface to the user provided by the surface assembly 10, and the skin 1 further includes an inner surface 12 opposite to the outer surface 11.

The light guiding stitch 2 is connected with the skin 1 by a sewing configuration 20, and the sewing configuration 20 includes a first part 21 located on the outer surface 11, a second part 22 penetrating thickness of the skin 1, and a third part 23 located in the inner surface 12.

Figure 2A:
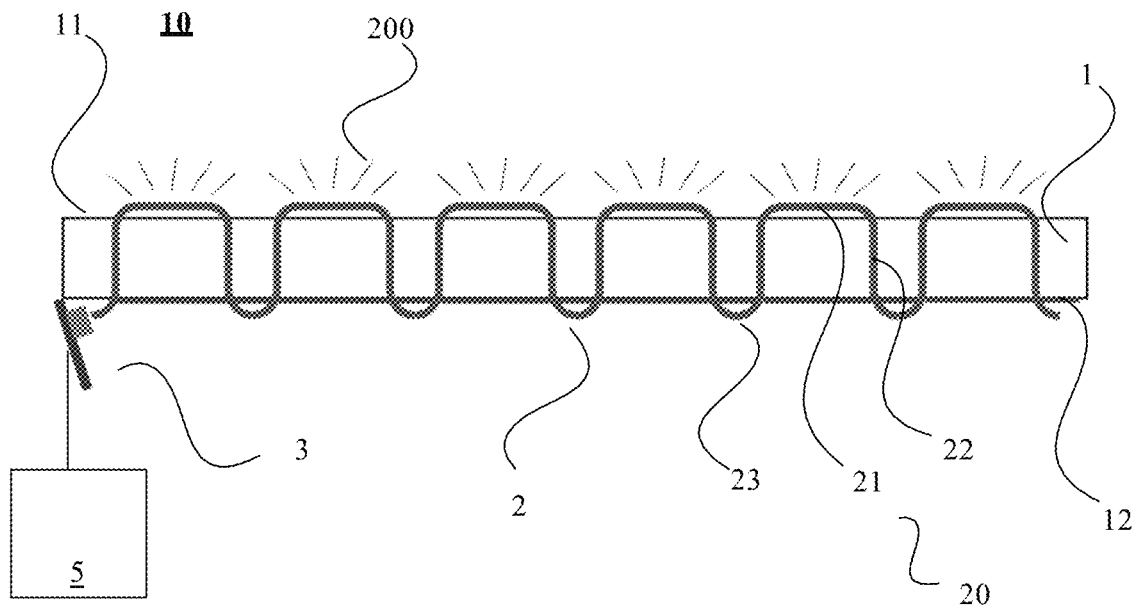
FIG. 2A and FIG. 2B are structural diagrams of the structure of a cross-sectional view and a top-down view of a skin in accordance with some embodiments of the present disclosure.
Figure 3A:
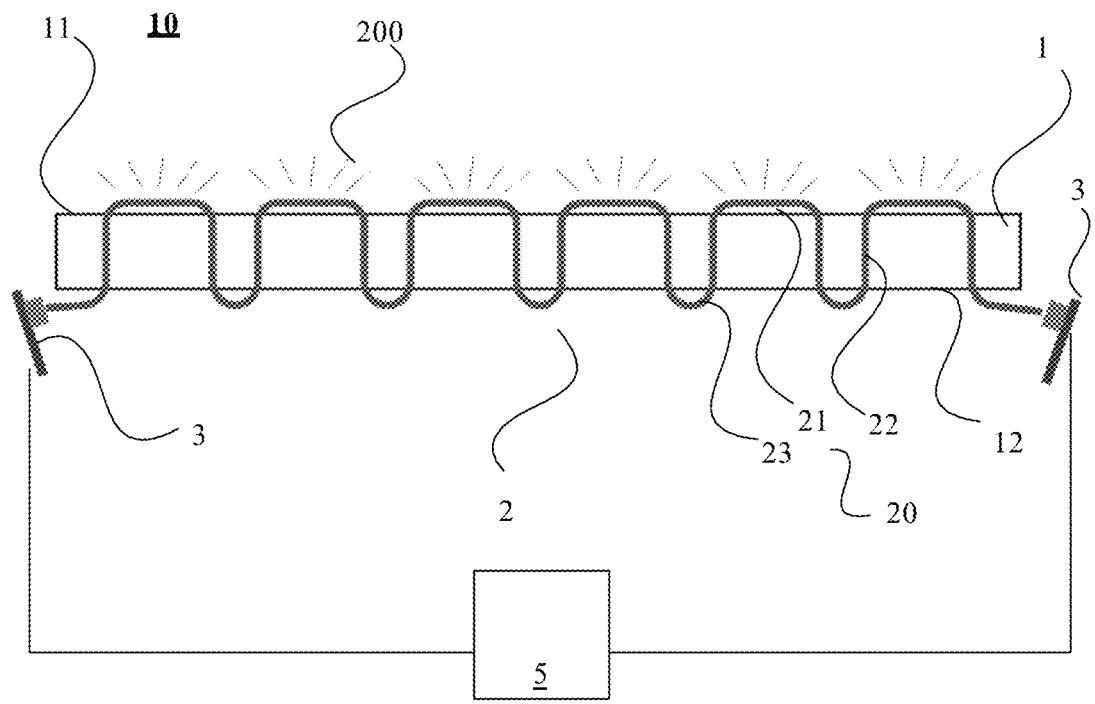
FIG. 3A and FIG. 3B are structural diagrams of the structure of a cross-sectional view and a top-down view of a skin in accordance with some other embodiments of the present disclosure.

As shown in FIG. 2A and FIG. 3A, the light guiding stitch 2 provides a light path that a light beam enters the light guiding stitch 2 at one end in length direction of the light guiding stitch 2, and emits through at least one first part 21.

In some embodiments, the material of skin 1 is normally leather, artificial leather, or fabric that can be used for sewing, and artificial leather includes PVC leather, PU leather, TPO leather, etc.

The concepts of "inner surface" and "outer surface" described in the embodiments are for users, that is, one surface close to the user during use is "outer surface", and the other side opposite to it is "inner surface".

The visible surface provided to the user provided by the interior part 100, is the outer surface 11 that the user can directly observe.

The meaning of the light guiding stitch 2, as the name suggests, a stitch having a light guiding function, and the meaning of the light guiding is similar to the common meaning in this art, guiding a light beam (such as the light emitted by the LED) from emitting position of the light source (for the LED light source is PCB board) to a position where lighting is needed. The material of the light guiding stitch 2 includes polymethyl methacrylate (PMMA), polycarbonate (PC), thermoplastic elastomer (TPE), thermoplastic polyurethane rubber (TPU). It can be understood that in addition to being transparent, the above materials are generally soft materials to facilitate sewing process. The light guiding member provides light beam to be transmitted in the light guiding member, and the optical teeth is designed to extract the proportion of light beam in a specific direction, making the illumination appearance of the light guiding member is uniform, and the principle of light transmission of the light guiding member is that when the light enters the surface of the object at an angle greater than the critical angle through the optical teeth, total reflection will occur in the light guiding structure. Without optical teeth, the light cannot emit out of the light guiding surface, and the light continues to transmit in the light guiding member. It can be understood that the light guiding stitch 2 is normally set with optical teeth, to realize that light beam emits out of the stitch 2 through the first part 21 located on the outer surface 11.

In some embodiments, the material of the light guiding stitch 2 is PMMA, and compared with the TPE, PU and PC, the inventor found that the light guiding stitch 2 made of PMMA material has better reliability, not only has a better light guiding performance, but also has a better thermal aging and light aging performance. It can be understood that although the transparency of a soft PMMA used as a stitch is slightly inferior to that of a hard PMMA, the transparency of the two is relatively close, which meets the basic transparency requirements of the light guide.

Figure 2B:
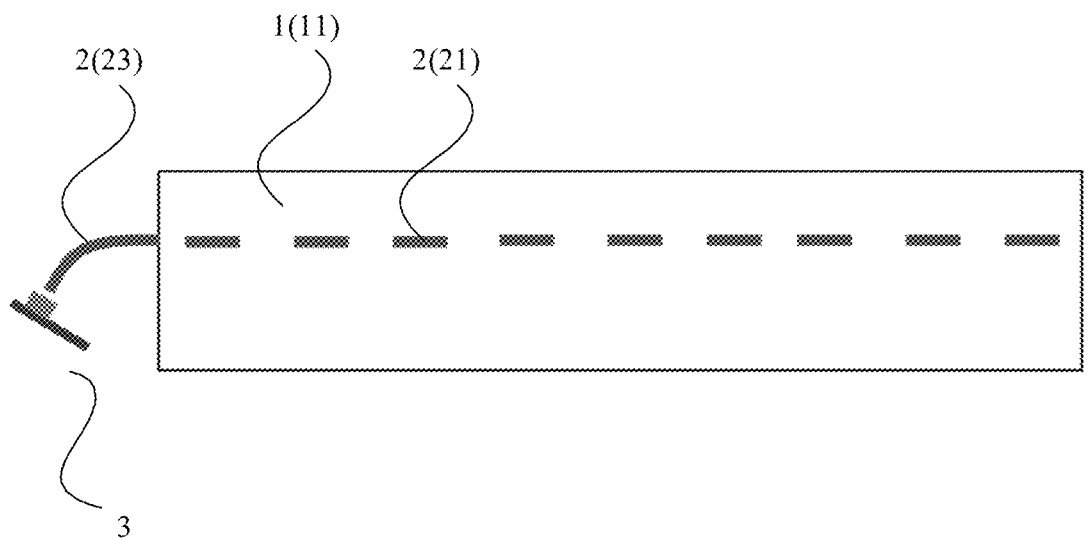
Figure 3B:
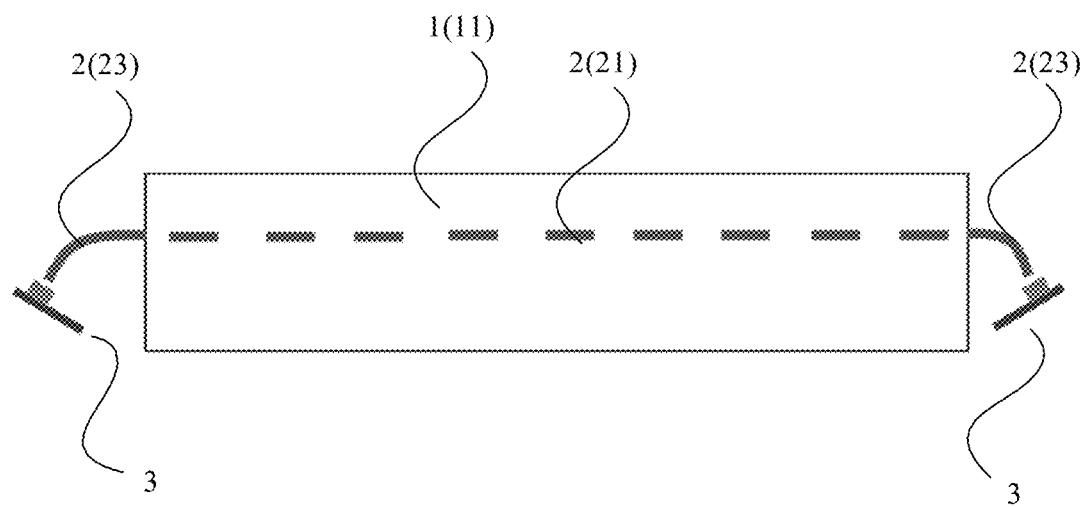

Continuing to refer to FIG. 2A, FIG. 2B, FIG. 3A, and FIG. 3B, in some embodiments, the surface assembly 10 further include a light source 3, and a light beam from the light source 3 follows a light path that the light enters the light guiding stitch 2 at one or more ends in length direction of the third part 23 of the light guiding stitch 2. For example, the light source 3 is arranged at one end of the length direction as shown in FIG. 2A and FIG. 2B, or the light sources 3 are arranged at both ends of the length direction as shown in FIG. 3A and FIG. 3B, but not limited thereto. The types of light source 3 includes sub-millimeter light-emitting diodes (Mini-LEDs) or laser diodes. Beneficial effect is that different lighting effects can be achieved through the control of the light source, the structure is simple and easy to achieve. As shown in the figures, the interior part 100 can also include a control unit 5, and the control unit 5 is electrically connected to the light source 3, and through the control of the light source 3 by the control unit 5, different lighting effects can be adjusted in real time.

As shown in FIGS. 4A to 4D, for skin 1, it can be a structure of multiple skins sewed connected, but this does not affect the light guiding stitch 2 providing a continuous appearance. The skin 1 includes a first skin 101 and a second skin 102 herein is only to describe a structural relationship between the transparent light guiding stitch 2 and adjacent skin 1, and it does not mean that the skin 1 only includes two skin pieces, and it can be understood that more skin pieces can be included.

Figure 4A:
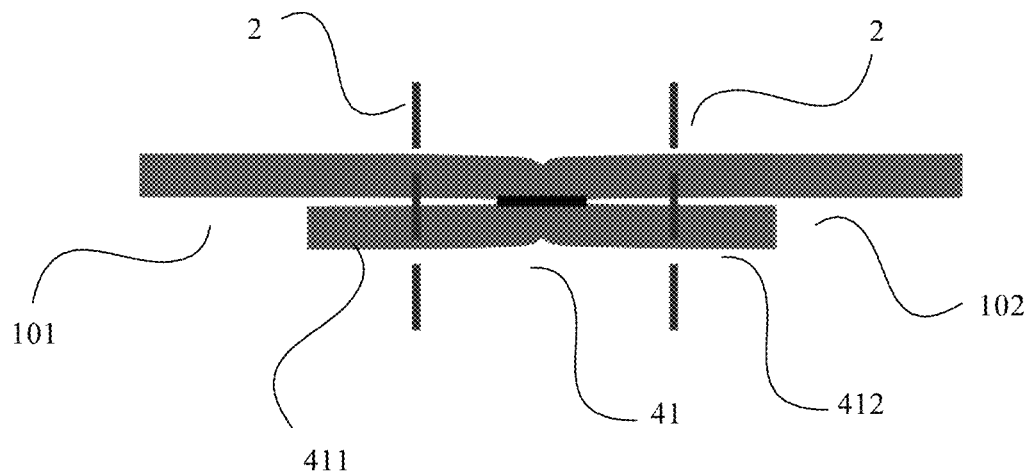

As shown in FIG. 4A, in a first embodiment, the first skin 101 and the second skin 102 are connected through a double felled seam 41, and the light guiding stitches 2 are respectively located on first felled region 411, second felled region 412 of the double felled seam 41.

Figure 4B:
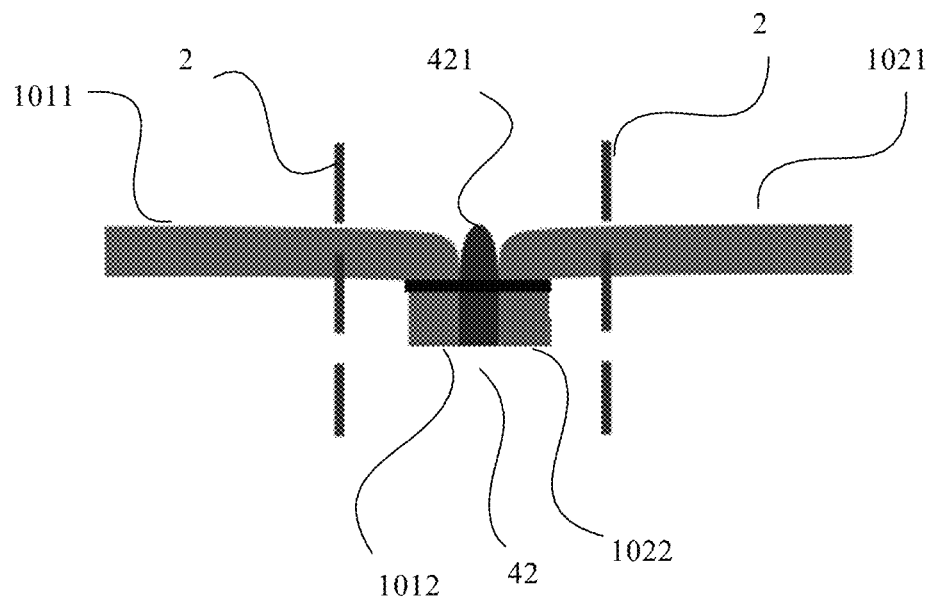

As shown in FIG. 4B, in a second embodiment, the first skin 101 and the second skin 102 are connected through a fake double felled seam 42, and the first skin 101 includes a first base part 1011 and a first connecting part. 1012, the second skin 102 includes a second base part 1021 and a second connecting part 1022, and a connector 421 is set between the first connecting part 1012 and the second connecting part 1022, and the first connecting part 1012, the second connecting part 1022 and the connector 421 are sewed and connected; and the light guiding stitches 2 are respectively located on the first base part 1011 and second base part 1021.

Figure 4C:
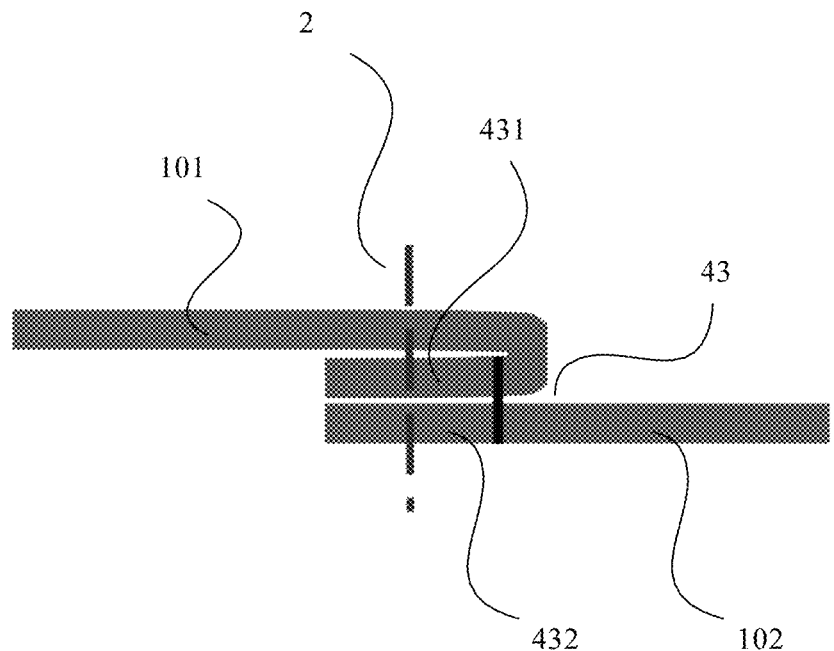

As shown in FIG. 4C, in a third embodiment, the first skin 101 and the second skin 102 are connected through a single felled seam 43, and one of the first skin 101 or the second skin 102 provides a felled part 431, and the other provides a connecting part 432 is directly connected to the felled part 431, and the light guiding stitch 2 is located on the felled part 431 and the connecting part 432.

Figure 4D:
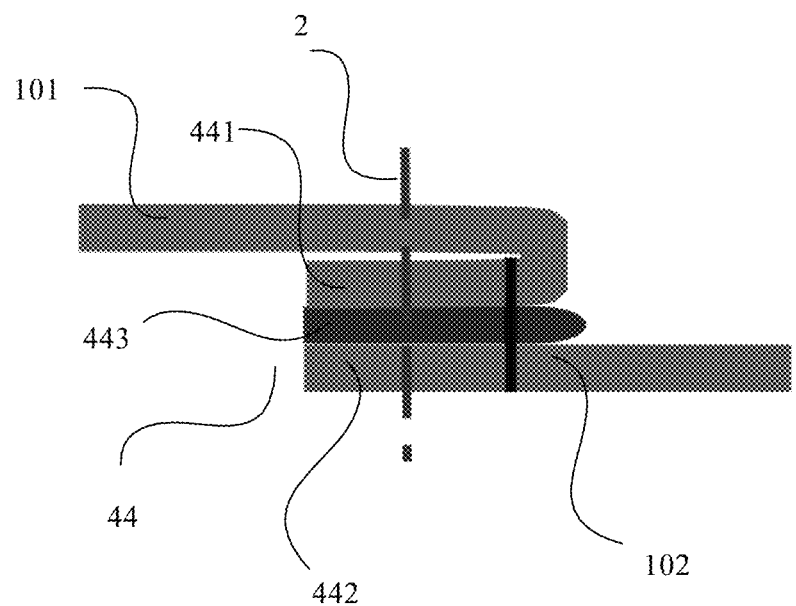

As shown in FIG. 4D, in a fourth embodiment, the first skin 101 and the second skin 102 are connected through a fake single felled seam 44, and one of the first skin 101 or the second skin 102 provides a felled part 441, and the other provides a connecting part 442, and a connector 443 is provided between the felled part 441 and the connecting part 442, and felled part 441, the connecting part 442 and the connector 443 are sewed and connected, the light guiding stitch 2 is located on the felled part 441, the connecting part 442, and the connector 443.

To sum up, beneficial effects of employing the surface assembly, the interior part and the interior system introduced in the above embodiments include, but are not limited to, by employing the structure of the light guiding stitch as the stitch of the skin, on the one hand, the skin has the lighting effect of surface luminescence, and the visible surface is overall continuous for users, and the appearance is better. And manufacturing process can be realized by common sewing process, and the process is relatively simple. Further, the interior part and interior system having the surface assembly, they can provide good user experience because their surfaces have the lighting effect of surface luminescence, and the visible surface is overall continuous for users.

Although the above embodiments of the present disclosure are disclosed as above, they are not used to limit the present disclosure. Therefore, any amendments, equivalent changes and modifications made to the above embodiments of the present disclosure without departing from the proposal of the present disclosure fall within the scope of protection defined in the claims of the present disclosure.

What is claimed is:

1. A surface assembly, comprising:
   a skin, and an outer surface of the skin being used as the outer surface of the surface assembly, and as a visible surface to the user provided by the surface assembly, and the skin further comprising an inner surface opposite to the outer surface; and
   a light guiding stitch, the light guiding stitch being connected with the skin by a sewing configuration, and the sewing configuration comprising a first part located on the outer surface, a second part penetrating thickness of the skin; and a third part located in the inner surface;
   and the light guiding stitch provides a light path that a light beam enters the light guiding stitch at one end in length direction of the light guiding stitch, and emits through at least one first part.

2. The surface assembly according to claim 1, wherein the light guiding stitch is made of PMMA.

3. The surface assembly according to claim 1, wherein the light guiding stitch is made of PC, TPE, or TPU.

4. The surface assembly according to claim 1, wherein the skin is made of leather, artificial leather, or fabric.

5. The surface assembly according to claim 1, wherein it further comprises a light source, a light beam from the light source follows a light path that the light enters the light guiding stitch at one or more ends in length direction of the third part of the light guiding stitch.

6. The surface assembly according to claim 5, wherein the light source comprises Mini-LED or Laser Diode.

7. The surface assembly according to claim 1, wherein the skin comprises a first skin and a second skin; wherein,
   the first skin and the second skin are connected through a double felled seam, and the light guiding stitches are respectively located on a first felled region, and a second felled region of the double felled seam;

or the first skin and the second skin are connected through a fake double felled seam, and the first skin comprises a first base part and a first connecting part, the second skin comprises a second base part and a second connecting part, and a connector is set between the first connecting part and the second connecting part, and the first connecting part, the second connecting part and the connector are sewed and connected; and the light guiding stitches are respectively located on the first base part and second base part;

or the first skin and the second skin are connected through a single felled seam, and one of the first skin or the second skin provides a felled part, and the other provides a connecting part directly connected to the felled part, and the light guiding stitch is located on the felled part and the connecting part;

or the first skin and the second skin are connected through a fake single felled seam, and one of the first skin or the second skin provides a felled part, and the other provides a connecting part, and a connector is provided between the felled part and the connecting part, and felled part, the connecting part and the connector are sewed and connected, and the light guiding stitch is located on the felled part, the connecting part, and the connector.

8. An interior part, comprising:

a surface assembly, comprising:

a skin, and an outer surface of the skin being used as the outer surface of the surface assembly, and as a visible surface to the user provided by the surface assembly, and the skin further comprising an inner surface opposite to the outer surface; and a light guiding stitch, the light guiding stitch being connected with the skin by a sewing configuration, and the sewing configuration comprising a first part located on the outer surface, a second part penetrating thickness of the skin; and a third part located in the inner surface;

and the light guiding stitch provides a light path that a light beam enters the light guiding stitch at one end in length direction of the light guiding stitch, and emits through at least one first part, and the outer surface of the skin is used as at least part of the visible surface of the interior part.

9. The interior part according to claim 8, wherein it further comprises a control unit, and the control unit is electronically connected to a light source.

10. An interior system, comprising an interior part, comprising:

a surface assembly, comprising:

a skin, and an outer surface of the skin being used as the outer surface of the surface assembly, and as a visible surface to the user provided by the surface assembly, and the skin further comprising an inner surface opposite to the outer surface; and a light guiding stitch, the light guiding stitch being connected with the skin by a sewing configuration, and the sewing configuration comprising a first part located on the outer surface, a second part penetrating thickness of the skin; and a third part located in the inner surface;

and the light guiding stitch provides a light path that a light beam enters the light guiding stitch at one end in length direction of the light guiding stitch, and emits through at least one first part, and the outer surface of the skin is used as at least part of the visible surface of the interior part.

* * * * *